United States Patent [19]

Speranza

[11] Patent Number: 5,588,324
[45] Date of Patent: Dec. 31, 1996

[54] METHOD FOR DETERMINING THE LEVEL OF A SUBMERGED LAYER OF LIQUIFIED MATERIAL

[76] Inventor: Bernard E. Speranza, 9216 White Oak Ave., Munster, Ind. 46321

[21] Appl. No.: 259,782

[22] Filed: Jun. 14, 1994

[51] Int. Cl.⁶ ................................................. G01F 23/00
[52] U.S. Cl. .................................... 73/290 R; 164/151.3
[58] Field of Search ......................... 73/290 R; 266/94; 164/151.3

[56] References Cited

U.S. PATENT DOCUMENTS

| | | | |
|---|---|---|---|
| 3,390,463 | 7/1968 | Hirsch | 73/290 R |
| 3,395,908 | 8/1968 | Woodcock | 266/94 |
| 3,460,386 | 8/1969 | Guignard | 73/290 R |
| 3,610,601 | 10/1971 | Bishop, Jr. | 266/34 |
| 3,850,416 | 11/1974 | Jackson | 266/1 R |
| 4,037,478 | 7/1977 | Cure | 73/864.59 |
| 4,250,754 | 2/1981 | Collins | 73/864.59 |
| 4,407,159 | 10/1983 | Wytaniec | 73/290 R |
| 4,413,810 | 11/1983 | Tenberg et al. | 266/94 |
| 4,544,140 | 10/1985 | Tenberg et al. | 266/99 |
| 4,880,212 | 11/1989 | Hägglund et al. | 266/94 |
| 4,899,994 | 2/1990 | Zhidkov et al. | 266/94 |
| 5,042,700 | 8/1991 | Ardell et al. | 222/590 |
| 5,103,893 | 4/1992 | Naganuma et al. | 164/451 |
| 5,105,874 | 4/1992 | Krausener et al. | 164/451 |

FOREIGN PATENT DOCUMENTS 0007316  1/1988  Japan .

*Primary Examiner*—Richard Chilcot
*Assistant Examiner*—Paul D. Amrozowicz
*Attorney, Agent, or Firm*—Wallenstein & Wagner, Ltd.

[57] ABSTRACT

A method for determining the level of a first layer of liquified material submerged below a second layer of liquified material is disclosed. A tube having first and second opposing tube ends includes a sacrificial cap covering the first tube end. The tube is adapted for insertion of the first tube end through the second layer into the first layer. The cap is adapted to substantially disintegrate after insertion into the first layer, such that pressure pushes a portion of the first material into the tube to a level substantially equal to the level of the first layer. A sensor determines the level of the measured portion in the tube.

20 Claims, 1 Drawing Sheet

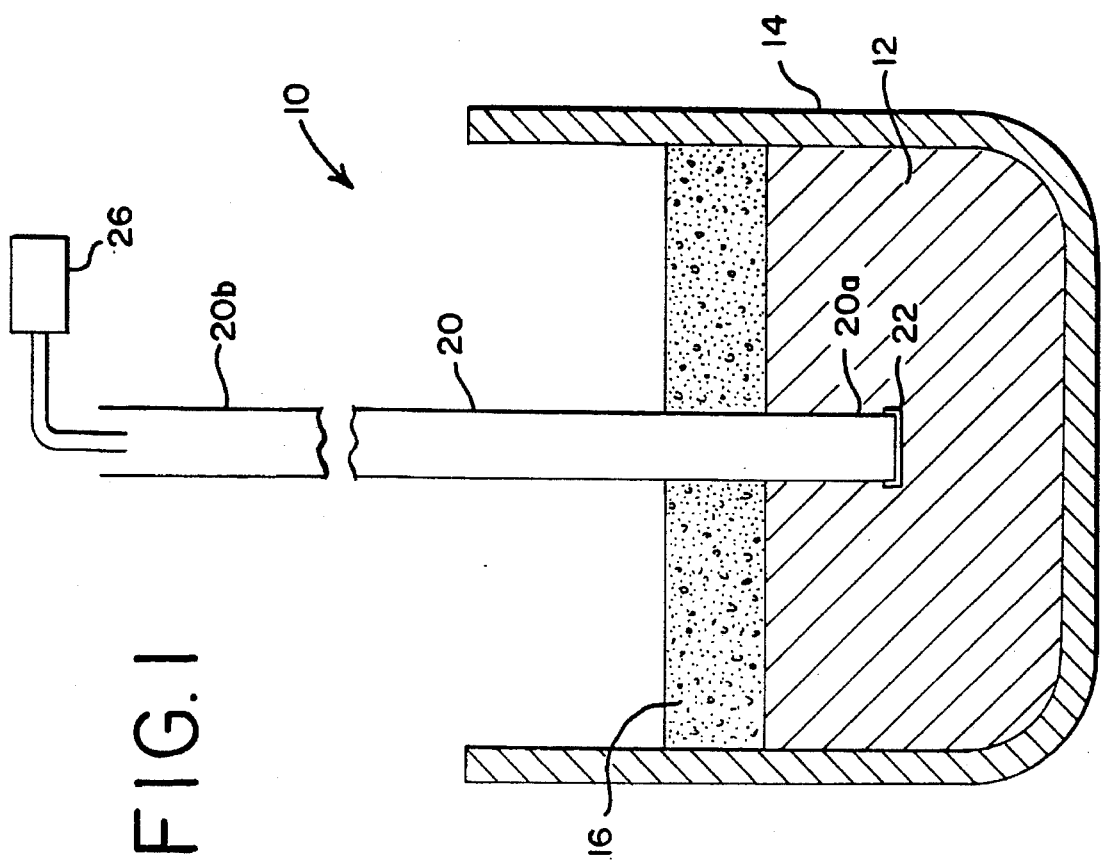

5,588,324

1

METHOD FOR DETERMINING THE LEVEL OF A SUBMERGED LAYER OF LIQUIFIED MATERIAL

TECHNICAL FIELD

The invention relates to a level determining system and, more particularly, to a system for determining the level of one layer of liquified material, such as molten steel, which is submerged below another layer of liquified material, such as slag.

BACKGROUND PRIOR ART

During one phase of producing steel, up to 400 tons of molten steel at a temperature as high as 3000° F., is contained in a vessel below a layer of slag, of approximately 2000° F. Typically the steel is dispensed through a hole in the bottom of the vessel into a tundish, from which the steel is then dispensed into caster molds. A conventional slide gate is often utilized to control the flow of molten steel/slag from the vessel.

To maintain high quality steel as an end product, it is desired that none of the slag exits the vessel into the tundish, thereby contaminating the end product. Various methods have been utilized in an attempt to accomplish this. One way is simply to overestimate the amount of slag, and to close the slide gate while there is still a buffer layer of molten steel in the vessel, to prevent slag from exiting into the tundish. However, this results in many tons of wasted steel per batch, as the steel remaining in the vessel will either result in scrap, or be utilized as a lesser grade steel product.

Alternatively, systems have been provided designed to detect slag exiting through the vessel hole. One system magnetically detects flow of slag through the vessel hole to close the slide gate. However this system is relatively complicated, and only detects slag after it has begun flowing through the vessel hole, thus possibly resulting in a certain amount of slag entering the tundish before complete closure of the slide gate. Similarly, another system disclosed in Netherlands patent 8006347 senses differences in sound pressure to determine when slag is exiting the vessel hole.

In order to better control the flow of the molten slag, it has been found desirable to more precisely know the level of the interface between the molten steel and the slag. Various systems have been proposed for this, such as disclosed in U.S. Pat. Nos., 4,544,140; 4,413,810; 3,610,601; 3,850,416; 5,105,874; 4,880212; and 4,899,994. However, these systems are relatively complex.

The present invention is provided to solve these and other problems.

SUMMARY OF THE INVENTION

It is an object of the present invention to provide a method and a system for determining the level of a first layer of liquified material in a vessel containing the first layer of liquified material submerged below the second layer of liquified material. These two layers could be adjacent layers in a vessel containing three or more layers of liquified material.

In accordance with the invention, a tube having first and second opposing tube ends, and a sacrificial cap covering the first tube end is provided. The tube is adapted for insertion of the first tube end through the second layer into the first layer. The cap is adapted to substantially disintegrate after insertion into the first layer, such that hydrostatic pressure pushes a corresponding portion of the first material into the tube to a level substantially equal to the level of the first layer. Means are provided for determining the level of the corresponding portion in the tube, which is indicative of the level of the first layer.

It is contemplated that the determining means comprises either a contacting or a non-contacting level gauge. The non-contacting level gauge utilizes electromagnetic radiation, sonic radiation, or other similar detecting means. The contacting level gauge comprises a float or such other similar means.

It is further contemplated that the tube is formed of cardboard, ceramic, or such other material which will not be rapidly destroyed when immersed in the vessel, but which will last a sufficient amount of time to accommodate the readings in an economical manner.

It is still further contemplated that the cap is formed of aluminum or such other material which will keep the tube closed until the tube end is inserted into the first layer, but which will not contaminate the material of the first, or other, layers.

Other features and advantages of the invention will be apparent from the following specification taken in conjunction with the following drawings.

BRIEF DESCRIPTION OF DRAWINGS

FIG. 1 is a schematic illustration of a system for determining the level of a submerged layer of liquified material in accordance with the invention; and FIG. 2 is a schematic illustration of the tube of FIG. 1 combined with a sacrificial cover.

DETAILED DESCRIPTION

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A system, generally designated 10, for determining the level of a first layer of liquified material, such as molten steel 12, in a vessel 14 containing the molten steel 12 submerged below a contiguous second layer of liquified material, such as slag 16, is illustrated in FIG. 1. The molten steel 12 has an upper steel surface 12a. It is to be understood those layers could be in a semi-liquified form.

A tube 20 has first and second opposing tube ends 20a, 20b, respectively. The tube 20 can be formed of cardboard having a wall thickness of approximately ¼", similar to tubes distributed by Midwest Instrument Co., Milwaukee, Wis., Alternatively, the tube 20 can be formed of ceramic, or such other suitable material which will not be detrimentally affected by immersion in either of the first or second liquified materials. The tube 20 should have a diameter determined by the measuring process and the particular liquified materials being measured. Tube diameters in the range of ½" to 6" are contemplated.

A sacrificial stopper, such as a cap 22, covers the first tube end 20a. The first tube end 20a is inserted through the slag layer 16 and into the molten steel layer 12. The cap 22 initially prevents slag and molten steel from entering the tube 20 as the tube 20 is inserted through the slag 16 and into the molten steel 12. However, the cap 22 substantially disintegrates after insertion into the molten steel 12, such that ferrostatic pressure pushes a portion of the molten steel 12 into the tube 20 to an intern metal level 12b substantially equal to the level of the molten steel 12. The cap can be formed of aluminum, approximately ¼" thick, as this small quantity of aluminum does not detrimentally affect the steel when melted. The level in the tube 20 is slightly higher than the level of the molten steel layer 12, due to the weight of the slag 16. However, the molten steel 12 is much more dense than the slag 16, and thus this error is considered negligible. Additionally, if a more accurate level is required, the weight of the slag 16 can be estimated, and such estimate used to estimate, and to compensate for, the error. This estimation can be performed iteratively, to further reduce the error.

Two measuring devices would permit determination of the exact location of the second layer, as well. Alternative materials can be used for the cap. The important feature is that either the material either melts or dissolves at the proper time and rate, or that the material be mechanically punctured.

A sensor 26 is provided for determining the level of the measured portion in the tube 20. The sensor does not invade the molten steel layer 12 and may be a non-contacting level gauge which uses electromagnetic waves, such as the DDSLR Radar Profilemeter, distributed by Dango & Dienenthal Maschinenbau GmbH of Siegen, Germany, and Dango & Dienenthal Inc., of Highland, Ind. This electromagnetic sensor transmits a modulated waveform into the tube, and calculates the time to receive its reflection. This time is indicative of the distance traveled by the waveform, and hence of the level of the liquified material in the tube 20. An alternative sensor is a microwave sensor, such as the "Z Meter" marketed by Special Control Systems, Cleveland, Ohio. The sensor could also utilize laser energy. Alternatively the sensor 26 could be an ultrasonic sensor, though the electromagnetic sensor has appeared to be more successful as the ultrasonic sensor requires additional temperature monitors for calibration.

Still further, the sensor 26 could be a contacting sensor, such as a float inserted in the tube 20, to determine the level of the molten steel in the tube 20.

It will be understood that the invention may be embodied in other specific forms without departing from the spirit or central characteristics thereof. The present examples and embodiments which have been described with respect to molten steel and slag, therefore, are to be considered as illustrative and not restrictive, and the invention is not to be limited to the details given herein. For example, the invention is believed applicable to the chemical processing industry, as well as for determining levels in a vessel containing three or more discrete layers.

I claim:

1. For a vessel containing a first layer of liquified metal having an upper metal surface, said layer of liquified metal being submerged below a contiguous second layer of slag, a method for determining the level of said upper metal surface of said first layer of liquified metal, the method comprising:

providing a tube having first and second opposing tube ends;

providing a sacrificial cap to cover said first tube end;

inserting said first tube end through said slag layer into said first layer of liquified metal;

permitting said cap to substantially disintegrate after insertion into said layer of liquified metal, such that pressure pushes a portion of said liquified metal into said tube to an internal metal level substantially equal to the level of said upper metal surface of said first layer of liquified metal while preventing entry of said slag into said tube; and utilizing a non-invasive level gauge to determine the level of said internal metal level of said portion in said tube without further invasion into said metal, which internal metal level substantially corresponds to the level of said upper metal surface.

2. The method of claim 1 wherein said step of determining the level of the measured portion utilizes a non-contacting level gauge.

3. The method of claim 2 wherein said non-contacting level gauge utilizes electromagnetic radiation.

4. The method of claim 3 wherein said electromagnetic radiation is in the microwave frequency spectrum.

5. The method of claim 1 wherein said determining means comprises a contacting level gauge.

6. The method of claim 5 wherein said contacting level gauge comprises a float.

7. The method of claim 1 wherein said tube is formed of cardboard.

8. The method of claim 1 wherein said tube is formed of ceramic.

9. The method of claim 1 wherein said tube is cylindrical.

10. The method of claim 1 wherein said cap is formed of aluminum.

11. For a vessel containing a layer of molten steel having an upper steel surface, said layer of molten steel being submerged below a contiguous layer of slag, a method for determining the level of said upper steel surface of said molten steel, the method comprising:

providing a tube having first and second opposing tube ends and adapted to withstand the heat of said molten steel and slag;

providing a sacrificial cap covering said first tube end;

inserting said first tube end through said slag layer into said molten steel layer, wherein said cap is formed of a material to maintain said first tube end covered while passing through said slag layer, but to substantially disintegrate after insertion into said steel layer, such that pressure pushes a measured portion of said steel into said tube to an internal steel level substantially equal to the level of said upper steel surface of said molten steel layer; and utilizing a non-invasive gauge to determining the level of said internal steel level in said tube without further invasion into said steel, which internal steel level substantially corresponds to the level of said upper steel surface.

12. The method of claim 11 wherein said step of determining the level of the measured portion utilizes a non-contacting level gauge.

13. The method of claim 12 wherein said non-contacting level gauge utilizes electromagnetic radiation.

14. The method of claim 13 wherein said electromagnetic radiation is in the microwave frequency spectrum.

15. The method of claim 11 wherein said determining means comprises a contacting level gauge.

16. The method of claim 15 wherein said contacting level gauge comprises a float.

17. The method of claim 11 wherein said tube is formed of cardboard.

18. The method of claim 11 wherein said tube is formed of ceramic.

19. The method of claim 11 wherein said tube is cylindrical.

20. The method of claim 11 wherein said cap is formed of aluminum.

* * * * *